United States Patent
Delrosso

[11] Patent Number: 6,088,501
[45] Date of Patent: Jul. 11, 2000

[54] APPARATUS AND METHOD FOR PROTECTING OPTICAL-FIBER DEVICES

[75] Inventor: Giovanni Delrosso, Sologno Di Caltignaga, Italy

[73] Assignee: Pirelli Cavi S.p.A., Milan, Italy

[21] Appl. No.: 08/808,888

[22] Filed: Feb. 28, 1997

[30] Foreign Application Priority Data

Mar. 11, 1996 [IT] Italy .................................. MI96A0466

[51] Int. Cl.[7] .................................................. G02B 6/02
[52] U.S. Cl. ................................ 385/134; 385/94; 385/92
[58] Field of Search ........................ 385/88–94, 134, 385/135

[56] References Cited

U.S. PATENT DOCUMENTS

| | | |
|---|---|---|
| 4,708,429 | 11/1987 | Clark et al. . |
| 4,733,932 | 3/1988 | Frenkel et al. ............................ 385/88 |
| 4,752,109 | 6/1988 | Gordon et al. ........................... 385/94 |
| 4,866,681 | 9/1989 | Fertig ...................................... 367/140 |
| 4,932,744 | 6/1990 | Messelhi ................................. 385/135 |
| 4,995,695 | 2/1991 | Pimpinella et al. ..................... 385/92 |
| 5,155,795 | 10/1992 | Wasserman et al. . |
| 5,195,102 | 3/1993 | McLean et al. . |
| 5,327,443 | 7/1994 | Tanaka et al. ............................ 372/36 |
| 5,355,425 | 10/1994 | Braiman et al. ......................... 385/31 |
| 5,430,820 | 7/1995 | Van Tongeren et al. ................. 385/94 |

FOREIGN PATENT DOCUMENTS

| | | | |
|---|---|---|---|
| 662622A1 | 7/1995 | European Pat. Off. .......... | G02B 6/42 |
| 3307933 | 10/1984 | Germany ......................... | H04B 9/00 |
| 0229208 | 9/1989 | Japan ................................ | 385/94 |
| 2217871 | 11/1989 | United Kingdom .............. | 385/94 |
| WO8906816 | 1/1989 | WIPO .............................. | G02B 6/42 |
| 89/06816 | 7/1989 | WIPO .............................. | 385/94 |

OTHER PUBLICATIONS

Patent Abstracts of Japan—vol. 6, No. 132 (E–119) Jul. 7, 1982 JP5758371, Takami.
Patent Abstracts of Japan—vol. 17, No. 416 (P–1584) Aug. 1993 JP5080360, Koji et al.
Patent Abstracts of Japan—vol. 12, No. 224 (P–721) Jun. 1988 JP63018308, Minoru et al.

*Primary Examiner*—Rodney Bovernick
*Assistant Examiner*—Ellen E. Kang
*Attorney, Agent, or Firm*—Norris, McLaughlin & Marcus; L. P. Brooks

[57] ABSTRACT

An apparatus for protecting optical fiber devices having at least one optical fiber length and control means associated therewith, includes a casing having at least one housing passing through the casing, in which casing the optical fiber length is inserted in such a manner that it is located inside the casing itself, in the presence of sealing means interposed between the housing and the casing, so that the housing is delimited in a substantially impervious manner with respect to the casing.

38 Claims, 6 Drawing Sheets

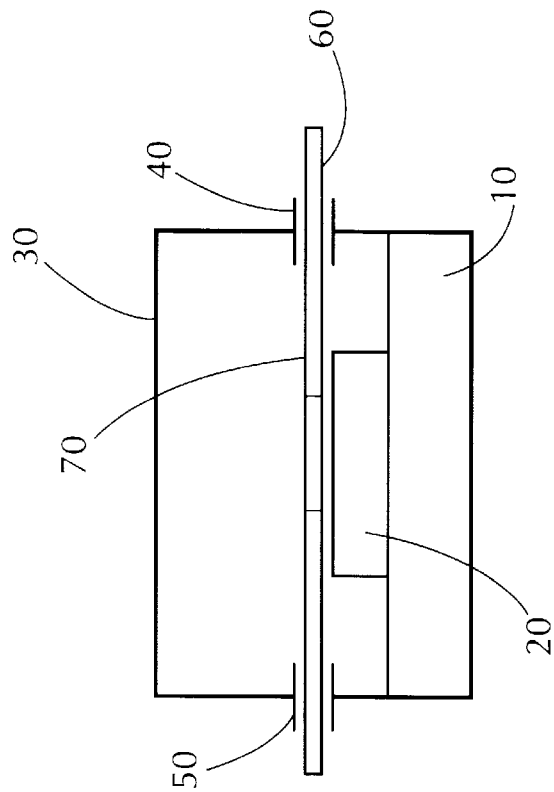
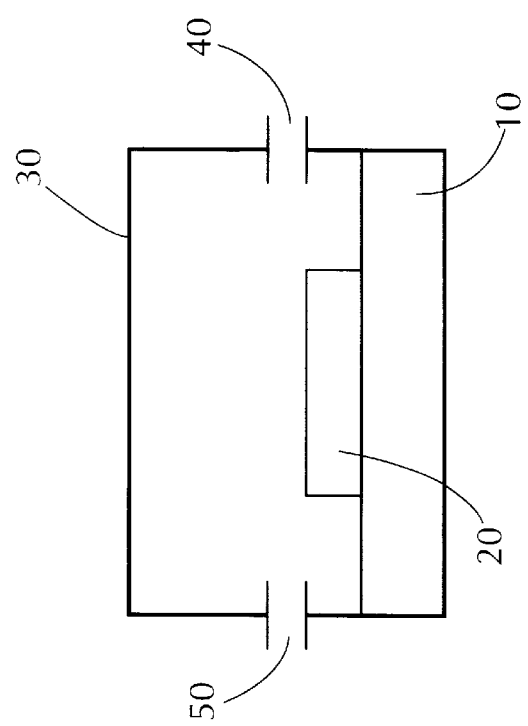

APPARATUS AND METHOD FOR PROTECTING OPTICAL-FIBER DEVICES

The present invention relates to the field of optical devices packaging and in particular refers to an apparatus and method for protecting optical devices made of optical fiber. In present opto-electronic applications the use of optical devices implemented on an optical fiber is becoming increasingly more required.

To the purposes of the present application, by optically active optical fiber or optical device it is meant an optical fiber length in which the refractive index is modified.

Devices of this type are for example: optical filters, resonant converters, multi-wavelength couplers, fiber lasers, Bragg grating reflectors, reflectors for pump laser, gain equalizers, fibers with chromatic dispersion compensating aperiodic (chirped) grating reflectors, attenuating fibers.

These devices for example can be realized on an optical fiber portion in which the refractive index is modified, using known techniques, either by a specific doping of this portion, made during the fiber manufacturing process, or by causing a modification of the optical characteristics of the fiber, in the core or at the surface thereof, made in a step subsequent to the fiber manufacture. In this last-mentioned case it is necessary to remove part of the acrylate coating of the fiber to carry out the necessary operations. Then the removed acrylate coating is applied to the fiber again in order to avoid damaging of same.

For use, these devices are combined with other components of different typologies, such as opto-electronic, optical or electronic elements, and this combination must be conveniently protected. The protection therefore must be capable of defending the optical devices and components from dangerous changes in the operating conditions involving for example temperature, humidity, pressure, mechanical stresses and others. In fact, there is often the presence of components, such as, for example, laser diodes, photodetectors, microoptics and integrated optics devices, or other components known in the art, that turn out to be particularly susceptible to changes in these operating conditions. Therefore for the purpose of minimizing the presence level of these contaminations, they need a conveniently clean and anhydrous environment.

For example, a Peltier-effect cell, that is usually integrated in opto-electronic devices to keep the optical components to the correct operative temperature, needs, in turn, the above described environmental requirements, so that it may be able to operate at its best.

A possible solution can be realized by adopting a container having a sufficiently hermetic seal such as to form internally an environment that can be little contaminated by said factors, in which particularly sensitive elements can be housed. Therefore, in order to ensure the final hermetic closure of a system, in the case of opto-electronic devices involving passage of one or more fibers through the walls of said casing, a direct sealing on the fiber of the passage opening becomes necessary.

For achieving the best results, the sealing can carried out by a conventional soldering operation.

To this purpose, it is necessary to act again on the optical fiber, because an acrylate portion must be removed from the fiber in correspondence of the passage opening in the container. The uncoated fiber length is carefully cleaned and metallized, by a first titanium layer for example, such that it bonds to the glass fiber, which is covered with a nickel or platinum layer and by a final gold or copper coating, in order to ensure an appropriate wettability of the fiber by the solder.

Said system ensures a high sealing or tightness level as required by the presence of these highly delicate components, thereby isolating them from the most dangerous effects of changes in the operative conditions.

However, it has been found by the Applicant that while an insulated environment can be successfully maintained at the inside, the container is responsive to those stresses that one wishes to keep away from the inner components.

For example, due to temperature changes, the container undergoes longitudinal deformations and, due to soldering, transmits these stresses back to the optical fiber length housed within it. As a result, since this portion is not free to move, it undergoes tensions due to the container expansions, followed by a return to a rest position when, due to a new temperature variation, the container shrinks again.

The effects caused by this action (shrinking effects) are very serious and can weaken the fiber to such a point that breaking of same occurs.

In addition, the optical fiber lengths in which metallization has been made are less flexible than the fiber lengths protected with acrylate and therefore more subjected to the risk of breaking.

A delicate aspect, as already said, is the quality of the internal environment of the container. In particular, the optical device must be able to maintain a constant temperature, quickly dissipating all heat excess that, transmitted by thermal conductivity from the fiber length located externally, could damage a correct operation of same. For this reason, the optical device is thermally controlled by one or more conventional Peltier cells, and consequently an efficient thermal connection is required between the last-mentioned component and both the portion to be made thermostable, that is the optical device, and an external dissipator through the container base. This connection is carried out by contacting the optical fiber with a Peltier cell and fastening said fiber thereto by a conventional soldering process.

Finally, the fastening operation between the two components (fiber-Peltier cell) must take place before carrying out sealing of the casing intended for protecting the optical device, as above described. The integrity of the operating features of the obtained system (assembly consisting of casing, components, sensors and optical fiber length containing the optical device) is likely to be altered due to the assembling operations, such as high temperature soldering, washings and other conventional operations.

According to one aspect of the present invention, the Applicant has found that it is not necessary that a system be found in which both the optical device and the components with which it is combined, a Peltier cell for example, coexist in environments practically sealed to the external atmosphere. In fact, their operating constraints are often different or even excluding each other.

The present invention relates to an apparatus in which there is a first environment capable of respecting the operative constraints of the components cooperating with an optical device and a separated environment in which the optical device is housed and in which the different operating requirements of the optical device are respected.

Therefore, in one aspect, the present invention relates to an apparatus for protecting an optical fiber device comprising a casing, at least one housing passing through said casing, in which at least one optical fiber length is fitted in such a manner that it is located inside the casing, and sealing means interposed between the housing and the casing, in which the housing is delimited in a substantially impervious manner with respect to the casing.

Within the casing a sufficiently insulated environment is formed in which the best conditions, of limited humidity for example, are created for the arrangement of given components, whereas in the housing a second environment can be obtained which is more suitable for respecting the constraints connected with the optical fiber, for example protection against mechanical and thermal stresses.

In addition, a housing is provided which has a heat conduction in a longitudinal direction, parallel to the passage axis, lower than in a transverse direction. Furthermore, this housing is preferably made of a low heat conductivity material.

The above enables the optical device to be better protected against external thermal variations.

Preferably, the housing is an element of tubular form, so that the fiber, of tubular form too, can be conveniently housed therewithin.

Typically, the casing comprises thermal control means contained thereinto, for keeping an operative temperature within the casing itself. In addition, the casing is in thermal contact with said control means. This enables a more careful control of the temperature variations in the optical device.

In a preferred embodiment of the present invention, the apparatus is equipped, within the casing, with thermal contact means creating a thermal contact between one portion of the housing and the control means. In addition, the one portion of said at least one housing corresponds to the middle portion of said at least one housing within said casing.

In a second embodiment of the present invention, provision is made for an apparatus for protecting optical fiber devices comprising a casing, at least one housing having at least one outlet to the outside in which at least one optical fiber length is inserted so that the latter is arranged within said casing, and in which the difference between the inner volume of said at least one housing and the overall volume of said at least one fiber length is sufficiently reduced, so as to enable both fitting of said at least one fiber length in said at least one housing and an appropriate insulation from the external environment of said at least one fiber length when it is inserted in said at least one housing, and adapted to house at least one fiber length, and sealing means interposed between said at least one housing and said casing, in which said at least one housing is delimited in a substantially impervious manner with respect to said casing.

In a further embodiment of the present invention it is provided a method of accomplishing an apparatus for protecting optical fiber devices comprising a casing, said method comprising the following steps: inserting in said casing at least one housing passing through the casing and adapted to house at least one optical fiber length; interposing sealing means between said at least one housing and said casing, which sealing means enables said at least one housing to be delimited in a substantially impervious manner with respect to said casing; inserting at least one optical fiber length in said at least one housing.

In this manner, the risk of altering the physical integrity of the optical fiber is greatly reduced, in that dangerous assembling operations, such as soldering of the casing, casting of the cap or washings for example, can be carried out in the absence of the fiber.

In addition, preferably, the method may further comprise the step of fastening said at least one fiber length to one end of said at least one housing. By fastening the fiber at a single end of the housing, said fiber is made independent of the deformations to which both the casing and the housing are subjected as a result of external temperature variations.

In a further aspect of the present invention, it is provided a method of protecting optical fiber devices characterized in that it comprises the following steps: assembling an apparatus for protecting optical fiber devices having at least one housing arranged to house an optical fiber length; and inserting said optical fiber length into said at least one housing.

The present invention will be described hereinafter, by way of example only, with reference to some embodiments thereof, as shown in the accompanying drawings, in which:

FIGS. 1a and 1b are diagrammatic representation of an opto-electronic apparatus in accordance with the known art;

Figure 2:
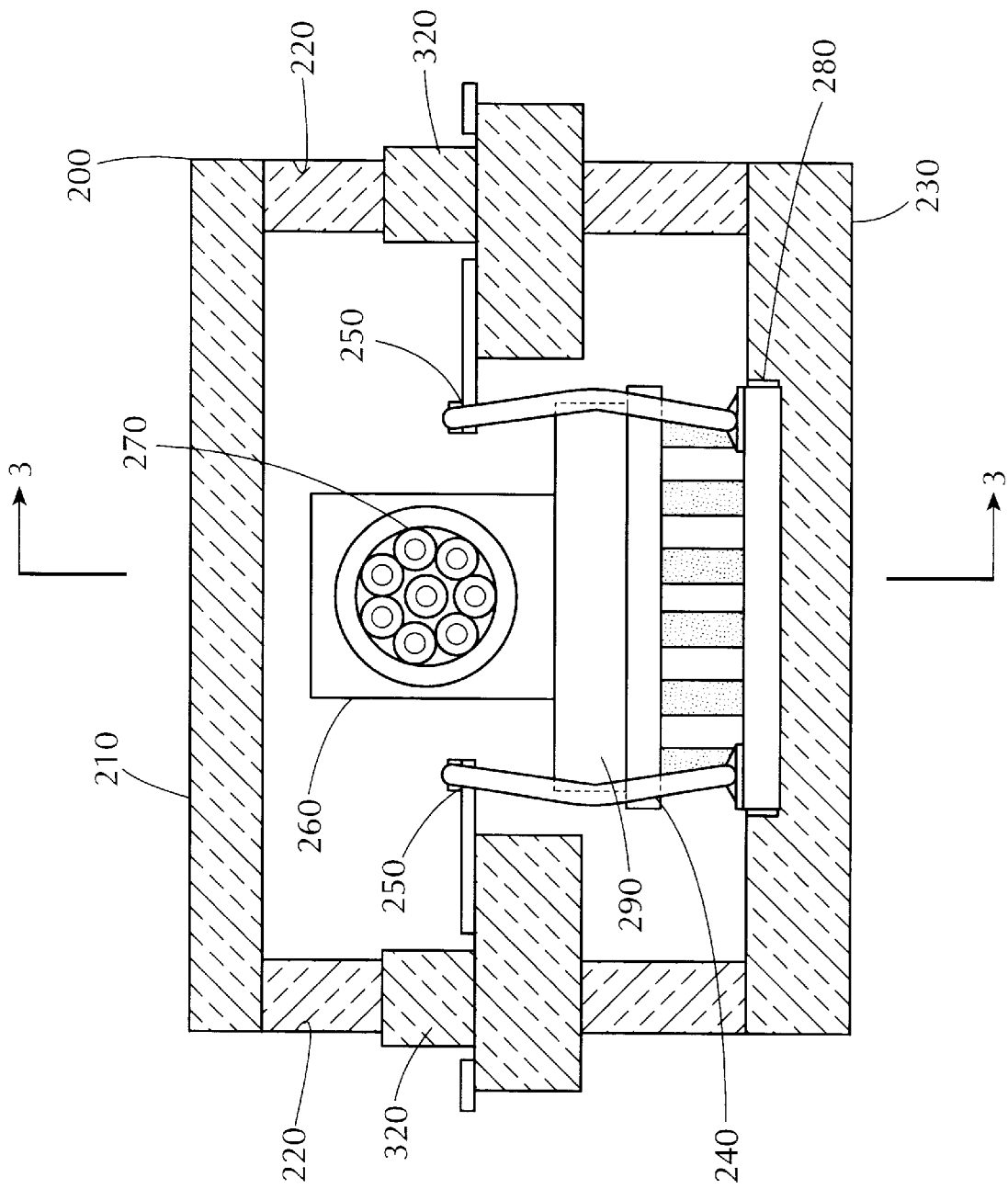
FIG. 2 is a sectional view of the opto-electronic apparatus according to one embodiment of the present invention, taken along line 2—2 in FIG. 3.

A conventional opto-electronic apparatus is shown in FIG. 1a. which is formed of a base 10, on which a Peltier cell 20 (a thermoelectric cooler) is located, all that being enclosed in a casing 30 serving to protect and insulate the components disposed inside it. In the casing there are two openings 40 and 50 through which an optical fiber 60 having an integrated optical device 70 integrated thereon, passes.

In FIG. 1b the same apparatus as in FIG. 1a is shown, internally housing the optical fiber length 60 on which the optical device 70 is made, which is to be kept at a constant temperature. The optical device 70 is then brought into contact with the thermoelectric cooler 20 having the function of keeping the optical device 70 to a constant temperature, for example by removing the heat resulting from thermal conductivity. In order to achieve a sufficiently anhydrous and insulated environment within the casing 30, openings 40 and 50 are closed, by soldering them to the optical fiber 60 by a conventional procedure, to carry out a sealing closure of the casing 30. To this end, intervention on the optical fiber is necessary and a portion of acrylate is removed at the passage openings 40 and 50 in the container 10. The uncoated optical fiber length is carefully cleaned and metallized, by means of a first titanium layer for example, so that it bonds to the fiber glass matrix, and it is subsequently covered with a nickel or platinum layer and a final covering of gold or copper to ensure an appropriate wettability of the fiber with the solder.

Figure 3:
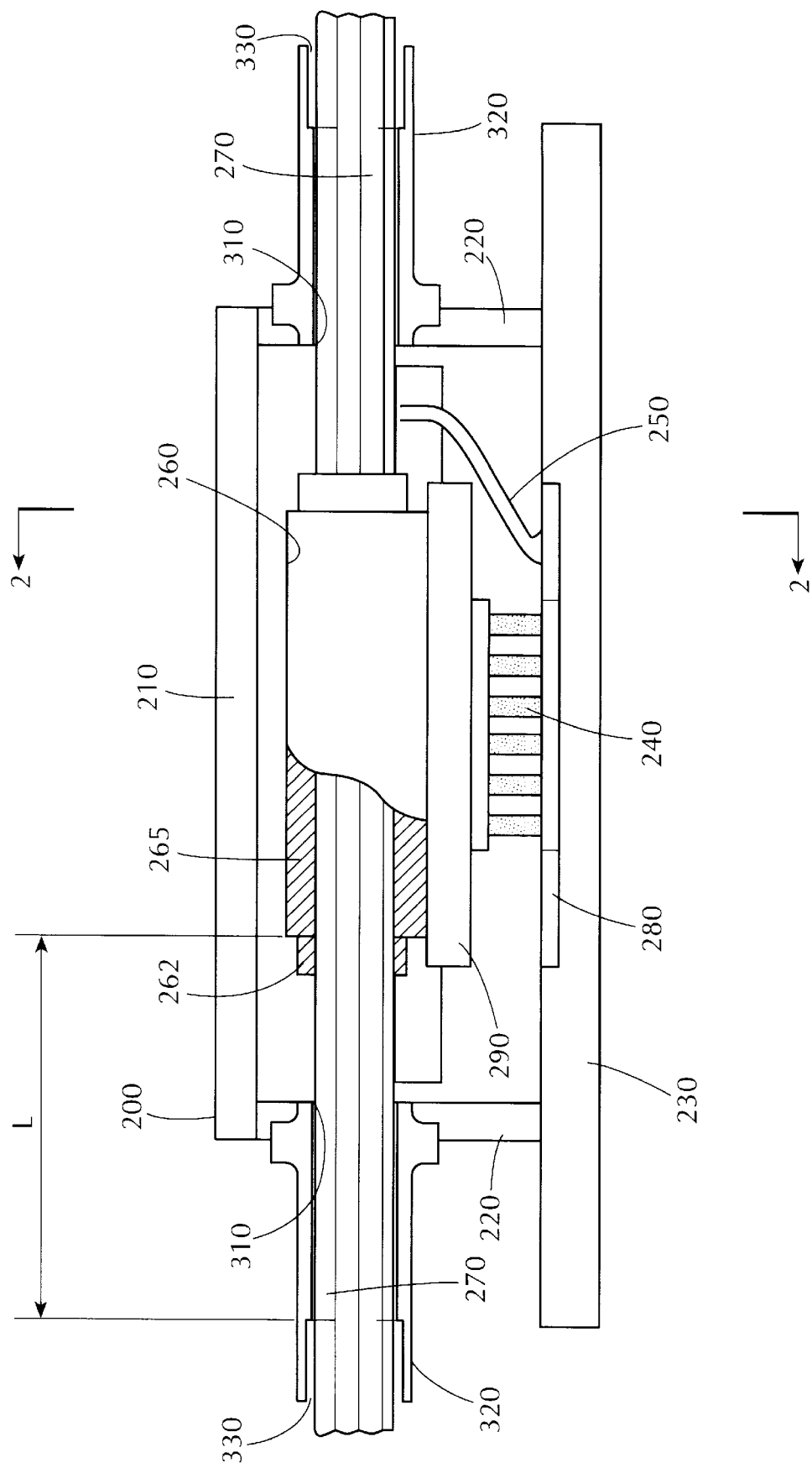
FIG. 3 is a sectional view of the opto-electronic apparatus taken along the line 3—3 in FIG. 2.

With reference to FIG. 2 and FIG. 3, showing two different views of the same opto-electronic apparatus in accordance with one embodiment of the invention, it is noted that it consists of an external casing 200 formed of a cover 210, side walls 220 and a base 230. All these parts are made of metal, preferably a metallic alloy of low thermal conductivity, Kovar™ (a nickel-cobalt alloy) for example.

In general, to the purposes of the present invention, by low thermal conductivity it is meant a sufficiently low conductivity so as to limit the (positive or negative) thermal flow to the optical devices within values lower than the dissipation capability of the thermal control device (a Peltier cell) employed under the provided operative conditions. For example, low thermal conductivity values of materials appropriate for the purpose range from 14 to 80 W/m°K, whereas by high thermal conductivity values are intended those values higher than 100 W/m°K (400 W/m°K, for example).

It is important to note that, for this apparatus, conditions of use are provided that typically involve environmental temperatures ranging from −20 to +70° C. The amount of parasitic heat that could flow into the area to be controlled is in the order of 0.5–21 Watt, which in conclusion involves a predictable electric consumption equal to 1.5–2 Watt. In order that the parasitic heat existing inside the apparatus may be dissipated, a Peltier cell 240 (a thermoelectric cooler) is in contact with the base 230 of said apparatus, which cell is connected by means of electrical contacts 250 with an outer electrical source and the associated control means not shown. To facilitate the assembling operations, the base is preferably provided with a recessed area 280 in which the lower part of the Peltier cell 240 is housed, said cell being fastened to the base 230 in a manner adapted to achieve an appropriate thermal contact using conventional methods such as for example gluing or soldering, or by fastening means such as brackets and the like. If a low thermal conductivity alloy is employed, as already said, the base 230 will have a moderate thickness, typically lower than 1 mm, to promote dispersion of heat generated by the Peltier- cell.

Alternatively, the base 230 can be made of a high thermal conductivity metal material, a copper or tungsten alloy for example. In this case, the base thickness should be preferably increased relative to the preceding embodiment (reaching values as high as some millimeters, for example), so as to form a dispersing element adapted to promote a heat exchange with the surrounding atmosphere.

In any case, both solutions are conveniently dimensioned and the related materials are such selected that they facilitate dispersion to the surrounding atmosphere of the generated heat conveyed by the Peltier cell 240 during operation of same.

It is apparent that by operating under different conditions, that is with low environmental temperatures, the Peltier cell will be obliged to transmit heat to the inside for keeping the area to be controlled to the desired operative temperature.

Preferably, a thermistor (not shown in the figure) is housed within the casing 200 monitoring the Peltier cell temperature and supplying an output voltage proportional to the temperature.

The output voltage is then used by a control circuit to control the current to be applied to the Peltier cell 240 through electrical contacts 250.

In addition, the casing 200 is passed through by one or more housings sealingly fastened, by soldering or other, as better described in the following, to two portions of the casing itself.

Preferably the two portions are located on two opposite side walls 220, but they may also be either on one and the same wall 220, or on one wall 220 and the cover 210, or on two contiguous walls 220. For example, these housings can be in the form of tubes 270. It is important to note that the tubes, extending to the outside of the casing, keep their inner space accessible from the outside but insulated from the inside of this casing 200.

Optical devices made on an optical fiber length (not shown in FIGS. 2 and 3) are inserted in the tubes 270 so that at the same time they are also actually housed within the casing 200. The diameter of each tube can be such sized that it will preferably enable the individual arrangement of an optical fiber length inclusive of its acrylate protection coating.

Preferably, the inner diameter of the tubes is adapted to receive the optical fiber length with a reduced clearance in order to facilitate a heat exchange, as described in the following. For example, in the case of optical fiber of a common type having an external diameter (inclusive of the acrylate coating) of 245–250 μm, tubes with an inner diameter of 260–300 μm, and preferably of about 270 μm, can be used. These tubes, just as an indication, may have an outer diameter of about 550–600 μm.

Since the heat flow to the inside of the casing depends on the tube section, and the length L of the tube portion which is exposed to thermal gradient and included between the external surface of the casing exposed to the external temperature (in particular, in the embodiment shown in FIG. 3, the end of the soldering area to the lead 320) and the tube portion controlled by the Peltier cell 240, in addition to depending on the thermal conductivity k of the material, it has been found, in accordance with the present invention, that, with a temperature difference ΔT of about 40–50° C., the tube section S, length L and the thermal conductivity k are mutually linked by the relation:

$$S/L = \alpha k^{-1},$$

wherein α is a value ranging between 1/50 and 1/5000 W/°K$^{-1}$ and preferably between 1/50 and 1/1200 W/°K$^{-1}$.

Therefore, the materials and thermal conditions being the same, as the tube length decreases, an increase in the power necessary to the Peltier cell occurs. For the sake of simplicity, by section S it is meant the section of the entire envelope of the tube bundle, as if it were a solid element completely made up of the material adopted for the tubes. Therefore, the empty spaces of the envelope and the optical fiber lengths inserted into the tubes are considered as having thermal conductivity k equal to that of the tube material.

For example, in the case of eight tubes made of stainless steel or Kovar™ (having a conductivity k=16 W/m°K) and an external diameter of about 600 μm, the length L is preferably included between 3.5 and 50 mm.

In particular, lengths close to the minimum limit will be preferred in the case in which a reduced size is required for the apparatus and powers up to 2 W can be dissipated through the Peltier cell, while lengths close to the maximum limit are preferred when dissipated powers in the order of 0.1 W are provided. Preferably, value L is comprised of a correction coefficient taking into account additional effects, such as the contribution to the heat flow coming from the casing walls. This coefficient, in the case of lengths L close to the minimum value (3.5 mm) has an incidence of about 30–40%, while it is negligible when L is close to the maximum value (50 mm). Should the tubes be made of a high conductivity material such as copper (K=400 W/m° C.), the length L of the tube portion subjected to the heat gradient will preferably be 60–100 mm or greater.

In the case in which the optical fiber has an optical device integrated on its end portion which is not of the "pass-through" type, a reflecting device for example, a person skilled in the art will recognize that it will be possible to simultaneously house two optical devices made on two different optical fibers within a single tube, without being obliged to increase the diameter of said tube. This can be done by inserting one fiber in each of the tube 270 sides, so that both devices are positioned within the casing 200, close to the cooler 240.

Alternatively, in the case of fiber devices not of the "pass-through" type, it is possible to adopt tubes having a single inlet opening, which therefore enter the casing without coming out of same.

Preferably, the length of the tube 270 portions included between the active portion of the optical fiber, that is that portion on which the optical device is implemented, and the casing 200 wall is of a sufficiently large value (on the order of some mm), while the tube thickness is limited to some tenths of a millimeter. In this manner an appropriate thermal insulation is carried out between the optically active portion of the fiber and the casing walls, without on the other hand penalizing and limiting the heat transmission through the tube 270 walls to a great extent. In this manner a tube 270 having a lower thermal conduction in a lengthwise direction, that is parallel to the crossing axis of the casing 200, than in a radial direction is obtained.

The wall thickness of the tubes 270 is suitable, in terms of stiffness and mechanical strength, for giving the fiber the necessary protection, but it is thin enough to ensure a sufficiently reduced thermal resistance in a radial direction, so that it facilitates thermal control of the fiber length on which the optical device has been made. Mechanically appropriate wall thicknesses of the tube 270 are also acceptable from a thermal point of view, above all if they use materials of a sufficiently low thermal conductivity, such as Kovar™ or stainless steel, for example. This enables passage of parasitic heat to be sufficiently controlled in a lengthwise direction, that is starting from the tube 270 ends up to the area of the intermediate portion thereof where the fiber length forming the optical device is localized.

It is also possible to use tubes 270 of a greater diameter in the case in which several optical fiber lengths are to be housed within a single tube 270, to protect optical couplers or other devices formed or comprised of several fibers in side-by-side relation for example.

In this embodiment, in order to avoid a great passage of parasitic heat, the tube needs to be maintained as much as possible adhering to the fiber bundle inserted therein, as it happens when a single fiber is concerned, although in some cases this could make insertion of said fibers more delicate. In this embodiment, in addition, for establishing the most appropriate sizes, it is necessary to take into account the fact that a greater size of the tube can make it more subjected to radial and longitudinal deformations due to temperature variations, and that it is therefore made to avoid these deformations, which can cause crushing of one fiber against the other thereby causing a possible variation in the refractive index of the optical device to such an extent that the behavior of same is modified.

Depending on requirements, possible additional elements can be inserted into the casing 200, such as, for example: additional Peltier cells, heating elements, piezoelectric actuators, temperature sensors, and thermistors electrically connected to the outside, if necessary, by appropriate electrical leads. In addition, the number of tubes 270 can vary from 1 to a rather high number (on the order of some tens, for example), consistently with the bulkiness and thermal transmission requirements. The tubes can be disposed either according to a crown-wise arrangement, as shown in FIGS. 2 to 5, or following a planar or multi-planar arrangement, as shown in FIG. 6 for example, or still following other geometries based on specific requirements.

The crown-wise arrangement of the tubes 270 enables openings of circular shape to be employed on the metal casing 200, which openings can be formed more easily than the openings of rectangular shape as required where a planar arrangement is used.

To keep the optical devices contained within the casing 200 at the operative temperature, the portion of each tube 270 housing the device is directly or indirectly maintained in thermal contact with the Peltier cell 240.

In the embodiment shown in FIGS. 2 and 3, eight bundle-arranged tubes 270 are employed which are made of low-thermal conductivity material offering high wettability to a solder. In order that also the tubes located farther from the cooler 240 should be efficiently maintained to the operative temperature, and with their optical devices housed therewithin, the tube portions within which the optical devices are housed are provided to be soldered with each other with a material of a sufficiently high thermal conductivity, preferably a tin and lead solder.

By material offering a high wettability to a solder is meant, to the ends of the present invention, a material on which the solder itself forms a concave meniscus.

Examples of materials of high wettability by a tin-lead solder are Kovar™, copper, silver, gold, bronze, nickel, brass.

Due to the tubes being susceptible of high wettability by the solder, it is difficult to prevent the solder from being disposed over the whole length of the tubes 270, which tubes, although made of a low thermal conductivity material, in the end would constitute a portion having a high thermal conductivity as a whole, thereby increasing the amount of the parasitic heat that could penetrate the interior of casing 200 and alter the operating conditions of the optical device.

Therefore, a top-open box 260 is contained in the casing 200 and it holds the tube portions to be soldered that pass inside it through sleeves 262 integral with the box itself. Preferably the box 260 is made of galvanized sheet iron material in order not to impair the thermal conductivity to the Peltier cell.

Preferably, the box 260 is put into contact with the Peltier cell 240 by means of a ceramic element 290 facilitating distribution of heat between the box 260 and the element 290.

The box 260 is then filled with a solder casting 265 that in this way is restricted in an axial direction and is only confined to the concerned tube portions.

To enable the tubes 270 to thoroughly pass through the casing 200, two sides of said casing are formed with an opening 310. In order to achieve an almost hermetic seal of casing 200, openings 310 are closed by soldering between the walls 220 and the tube portion close to the crossing point.

If necessary, the tube portion 270 at the crossing point can be metallized in a conventional manner to improve wettability of same by a solder.

In addition, for increasing the thermal insulation of the optically active fiber portion, a tubular element 320 is added close to the openings 310 for substantially extending the casing 200 in a direction parallel to the tube axis and surrounding them tubes over the whole length thereof and terminating with a new opening 330 of substantially the same size as opening 310.

Element 320 is preferably made of the same thermally insulating material as used for casing 200 and aims at increasing the thermal insulation of the optically active fiber portion disposed within the casing 200 by increasing the distance between said active portion and the fiber portions in contact with the environment exterior to the casing 200 which are subjected to thermal changes.

In this case the casing 200 sealing will be ensured by closing openings 330 by a conventional soldering operation between the end portion of element 320 and the corresponding tube 270 portion.

A vacuum can be created in the volume exterior to the tube portion but within the casing 200, or this space can be filled with materials of reduced thermal conductivity, to decrease the transmission of heat to within the casing 200.

Either gaseous materials such as air or suitable gases preferably of high molecular weight, such as, among others, argon, krypton, and xenon, may be used for example, or this space may be filled with materials of higher density such as silica, ceramics, glass powders, polymers, resins or foamed polyurethane material.

Then, at the end of the procedures for fitting together the assembly consisting of casing, components, sensors, electrical contacts, tubes and other possible necessary things, incorporation of the optical fiber takes place.

Thus the fiber integrity and the operating features of same are prevented from being altered as a result of the assembling operations involving possible high-temperature soldering, washings and other conventional operations. In addition, should it be necessary to replace the optical fiber portion and/or the optical device formed thereon, this operation can be carried out independently of the other fiber lengths housed in other different tubes and furthermore it is not necessary to act on the whole assembly.

Finally, due to the reduced clearance between the tube walls and the optical fiber inserted therein, the use of a plugging material to keep the fiber in place is no longer necessary, although still possible. Said fiber is preferably fastened to one or both ends of said tube by one or more soldering or by gluing, which may even be of a removable type, leaving the fiber sufficiently loose so that it is not subjected to stresses by the tube when it undergoes deformations due to the temperature variations to which it is submitted, under use, storage, and transport conditions or others.

Preferably the fiber is glued to the tube at a single end thereof, for example by means of a weak silicone-based bond, so that it can be easily removed when the fiber is required to be extracted from the assembly. In addition, an indicator may be provided on the optical fiber length to be inserted so that the step involving positioning of the device integrated in the fiber within the tube 270 shall be simplified.

Figure 4:
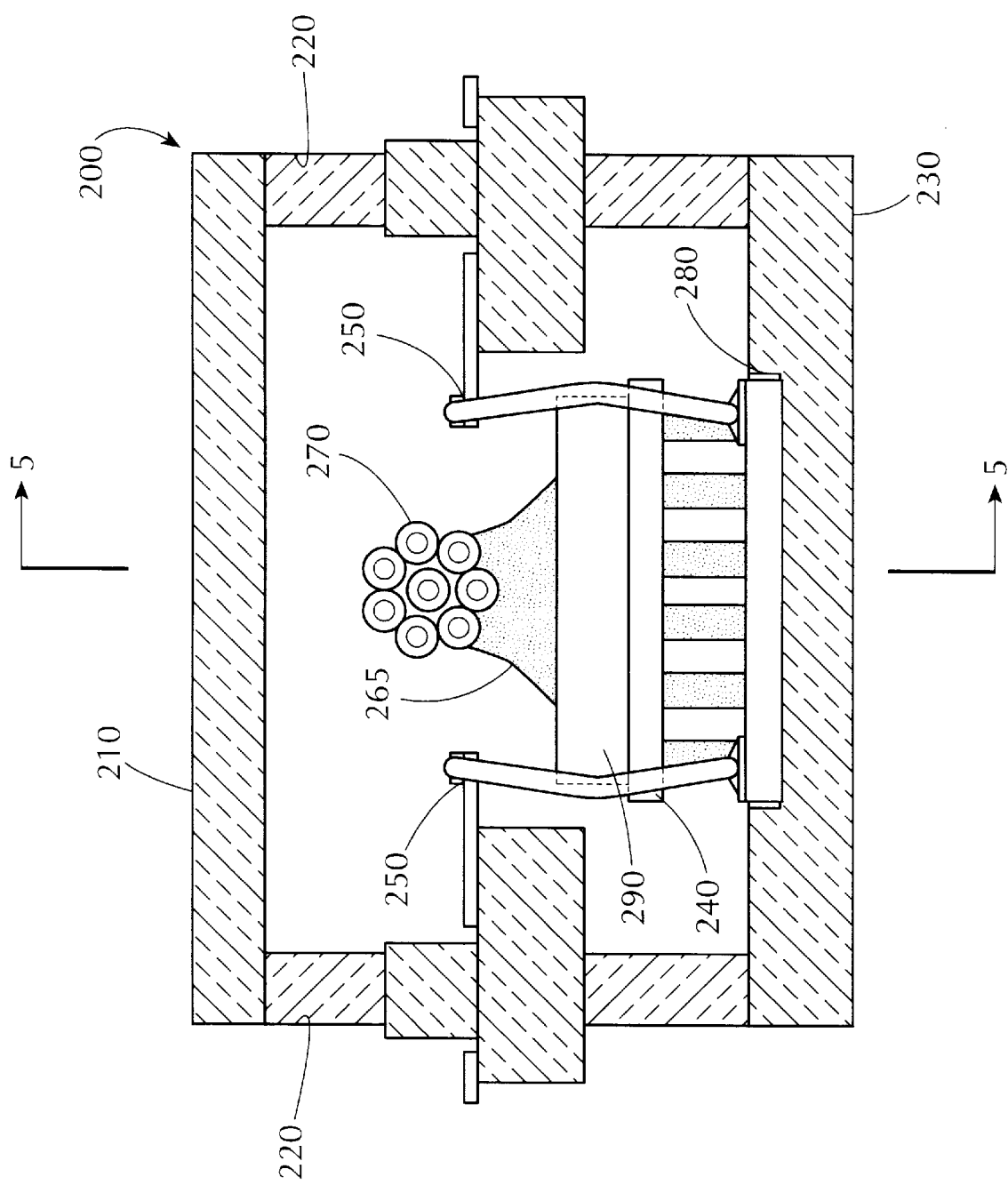
FIG. 4 is a sectional view of the opto-electronic apparatus in accordance with a different embodiment of the present invention, taken along line 4—4 in FIG. 5.
Figure 5:
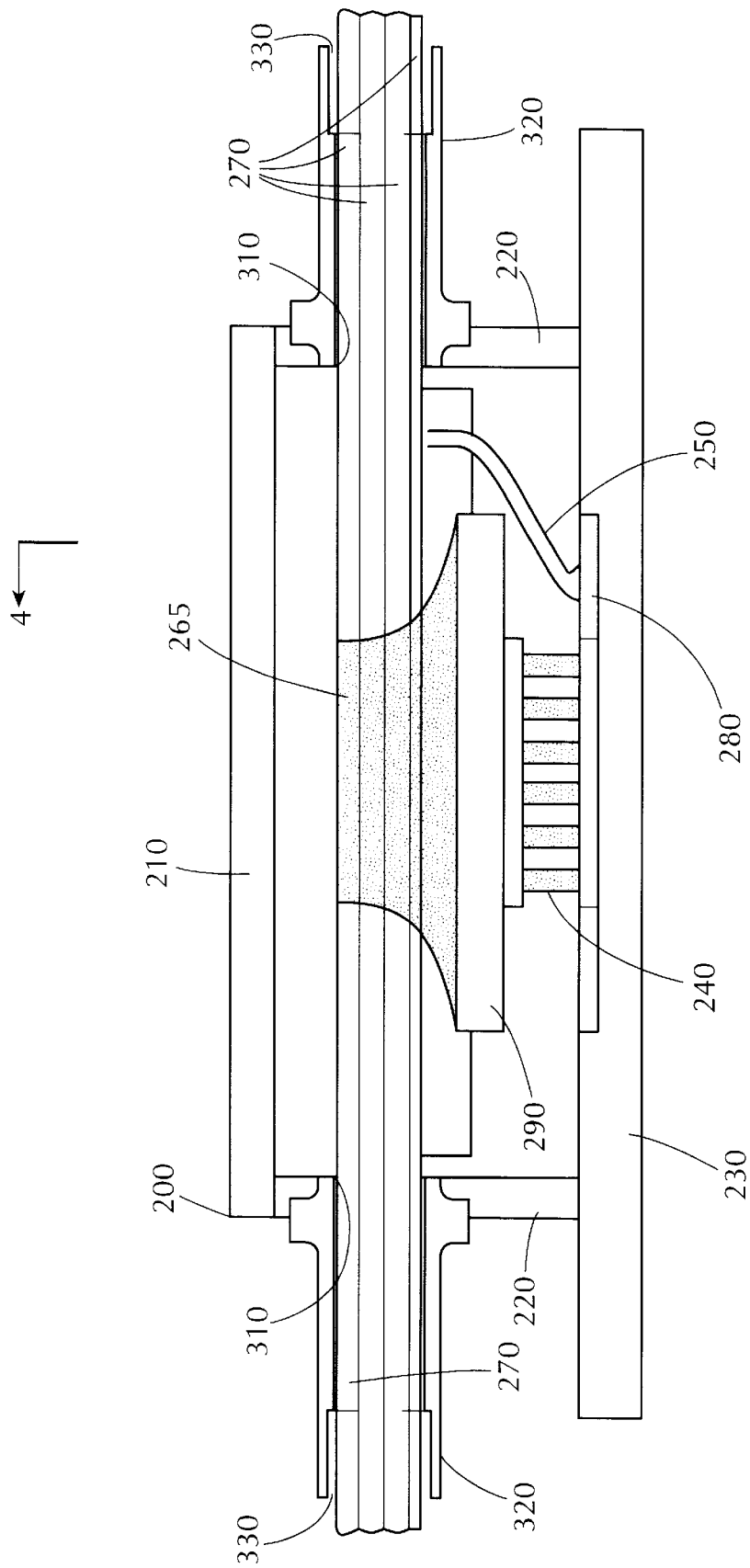
FIG. 5 is a sectional view of the opto-electronic apparatus taken along the line 5—5 in FIG. 4.
Figure 6:
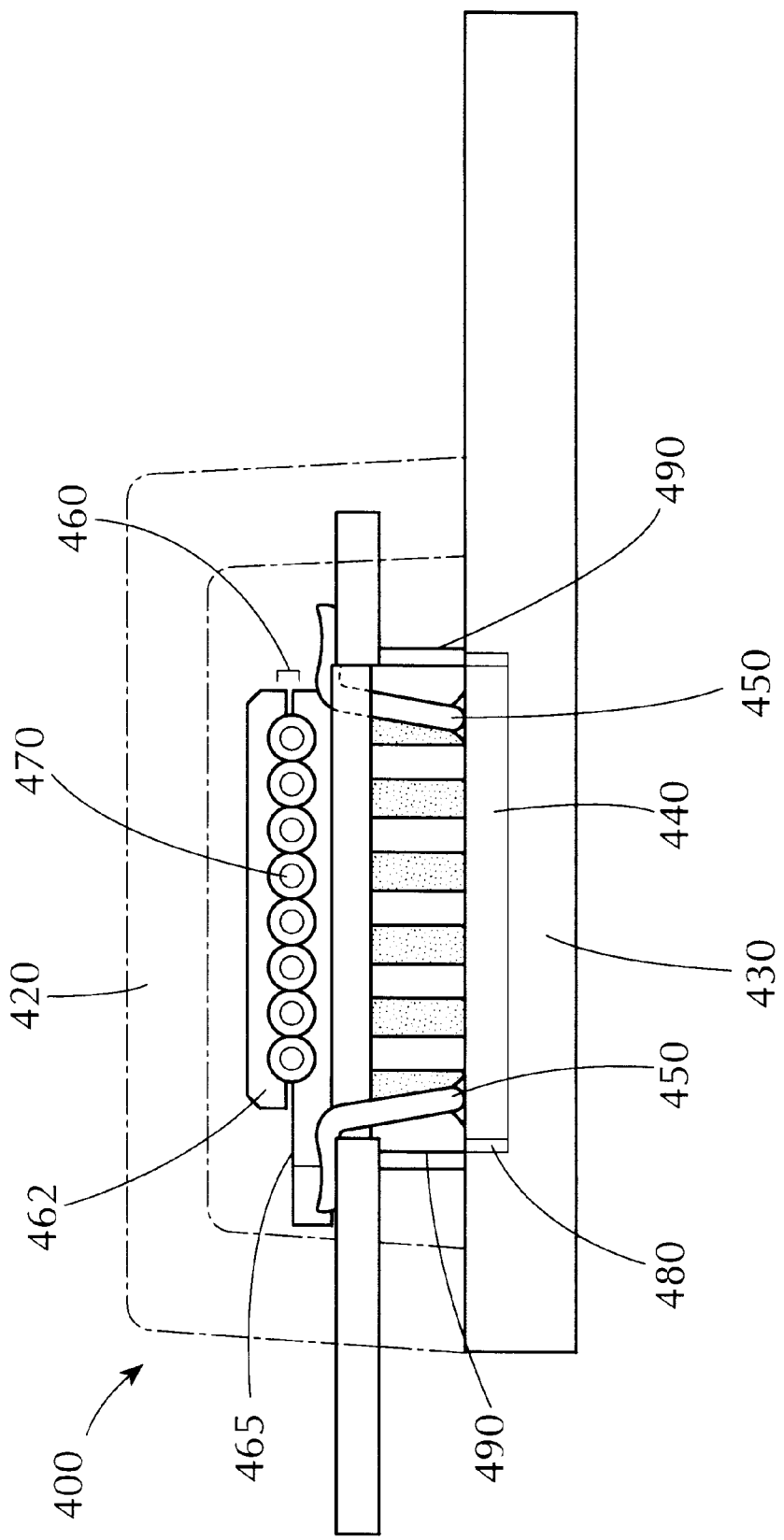
FIG. 6 is a transverse sectional view of an opto-electronic apparatus in accordance with another alternative embodiment of the present invention.

Referring now to FIGS. 4 and 5, a different embodiment of the inventive apparatus devoid of the box 260 will be described, in which corresponding parts are identified by the same reference numerals.

In this apparatus, eight tubes 270 arranged crown-wise are present. They are formed of a low thermal conductivity material exhibiting low wettability by a solder. In this case too, in order to enable the tubes located farther from the cooler 240 to be efficiently held to the appropriate temperature, their optical devices being housed within them, it is provided that the tube 270 portions, where the optical devices at be maintained to a controlled temperature are housed, should be soldered together by a high thermal conductivity material, preferably a tin and lead solder.

By material of low wettability by a solder is meant a material forming a convex meniscus with said solder. Materials of low wettability to the above tin and lead solder are stainless steel or other iron or aluminum alloys that also offer a low ability to be wetted when in contact with said solder.

By virtue of the reduced wettability of tubes 270 by the solder, no risk exists that the thermal conductivity of same may be modified as in the preceding case following an uncontrolled spreading of the solder over the tubes. However, it is to be noted that the material used to make the tubes 270, when suitably treated by appropriate pickling or fluxing agents or submitted to deposition of materials of high wettability to the solder, such as those previously mentioned, becomes in turn highly wettable.

In fact, a selective soldering can be obtained by previously metallizing the concerned tube portions, so that only said portions are made wettable to the solder. As to metallization, preferably a nickel layer is first applied and then a gold or copper layer, following known techniques. In this case too the solder casting forms a thermal contact element 265 between the concerned tube portions and the cooler 240.

In addition, in this case too a ceramic element 290 may be present and it is disposed between the thermal contact element 265 and the cooler 240.

The above described embodiment will be also operable in the case in which the optical device integrated on the fiber length incorporated in the assembly should require an optical coupling with a different optical device which is not implemented on an optical fiber, such as a semiconductor pump laser or a monitoring photodiode, for example. In this case it will be sufficient to protect the device formed on the optical fiber according to the teachings of the present invention, while the optical device which is not made on the optical fiber will be protected by adopting conventional techniques. Apparatuses for protecting devices of the last-mentioned type are known in the art, from the international patent application issued under No. WO 89/06816, for example. Described in WO 89/06816 is an opto-electronic apparatus in which a semiconductor laser transmitting optical signals through an optical fiber with which it is associated is housed within a protective container.

In another embodiment of the present invention, the incorporation of a fiber length into a tube 270 is also possible in such a manner that the fiber length does not emerge from the tube or only emerges from one side thereof. The end tube portion or portions free from the fiber passage are then closed by a glass element capable of letting light signals pass from or through the fiber length disposed within the tube.

In another embodiment of the present invention, in which a device less sensitive to temperature changes, for example, or a device intended for operation in an already thermally controlled environment, shall have to be protected, an appropriate insulation could be ensured by merely establishing an appropriate distance between the optically active fiber portion and the optical fiber length located externally of the casing 200. Under this situation the use of other devices, within the casing 200 itself, adapted to ensure temperature control, such as the thermal cooler 240, is no longer necessary.

Referring now to FIG. 6, in another embodiment of the present invention as therein shown, the casing 400 forming the closure comprises a cap 420 of plastic material, epoxy resin for example, and a base 430 of a low thermal conductivity metal material, Kovar™ for example.

A Peltier cell 440 is disposed within the casing 400 in contact with the base 430 and it is connected to an external electrical source by electrical contacts 450.

Preferably, in order to facilitate assembling operations, the base is formed with a recessed area 480 in which the lower portion of the Peltier cell 440 is housed. In addition, for promoting dispersion of the heat absorbed by the Peltier cell 440, the base may be made of a different metal material, this time of high thermal conductivity, a tungsten or copper alloy for example, the thickness of which is to be increased as compared with the embodiment having a low thermal conductivity material.

In the described solutions the dispersion to the outside of heat from the Peltier cell 440 during operation of the latter takes place through the base.

In addition, the cap 420 is passed through, over the whole length thereof, by one or more housings sealingly fastened, as better clarified in the following, close to openings present in two preferably opposite portions of the cap. In particular, these housings can take the form of tubes 470.

It is important to note that the tubes, when extending to the outside of the casing, keep their inner space accessible from the outside but insulated from the interior of casing 400.

Optical devices (not shown in FIG. 6) made on an optical fiber length are fitted in the tubes 470 in such a manner that at the same time they are actually within the casing 400 too. The diameter of each tube can have such a size that preferably the individual arrangement of an optical fiber portion inclusive of its protection coating made of acrylate is allowed. Should the optical fiber have an optical device integrated on the end portion thereof, a reflecting device for example, it will be recognized by a person of ordinary skill in the art that two optical devices implemented on two different optical fibers can be also simultaneously housed within a single tube, without being obliged to increase the diameter thereof. This is possible by fitting one fiber into each side of the tube 470 so that both devices are positioned within the casing 400, close to the cooler 440.

Preferably the length of the tube 470 portions included between the active portion of the optical fiber, that is the portion on which the optical device is implemented, and the casing 400 wall is sufficiently long (in the order of some mm), whereas the tube thickness is limited to some tenths of a millimeter. In this manner an appropriate thermal insulation is obtained between the optically active fiber portion and the casing walls, without on the other hand excessively penalizing and limiting the heat transmission through the tube 470 walls.

In fact, each tube 470 has an appropriate wall thickness, in terms of stiffness and mechanical strength, but said thickness is thin enough to ensure a sufficiently reduced thermal resistance in a radial direction, in order to facilitate thermal control of the fiber length on which the optical device has been implemented. Mechanically appropriate wall thickness of the tube 470 generally are also acceptable from a thermal point of view, especially if materials of a sufficiently reduced thermal conductivity are utilized, such as Kovar™ or stainless steel, for example. In this manner an appropriate restriction in the parasitic heat transmission in a lengthwise direction is ensured, that is starting from the tube 470 ends to the area of the intermediate portion where the fiber use of length forming the optical device is located.

The use of tubes 470 of greater diameter is also possible when one wishes that more optical fiber lengths should be housed within a single tube 470, for protecting optical couplers for example.

In order to maintain the optical devices housed within the casing 400 at the operative temperature, the portion of each tube 470 containing the device is directly or indirectly maintained in thermal contact with the Peltier cell 440 carrying out removal of the parasitic heat.

In a possible embodiment, as shown in FIG. 6, the use of a high thermal conductivity element 460 forming the rest plane for tubes 470 and for example made either of metal material such as silicon, ceramics or of a thermally conductive plastic material, preferably Kovar™, is provided within the casing 400.

In particular, the element 460 is formed of an upper portion 462 and a lower portion 465 directly in contact with the Peltier cell 440. This element 460 contains the tube portions inside which the optical devices to be kept to temperature are housed. Preferably, to facilitate assembling and fastening operations of the assembly, both portions 462 and 465 of the element 460 are provided with grooves adapted to receive the tubes that will be disposed in register therewith.

In this case, keeping the optical devices to temperature by the cell 440 is particularly efficient, by virtue of the planar arrangement of tubes 470. This arrangement is more advantageous as compared with the previously described crown-wise arrangement referred to in FIGS. 2 to 5, because no tubes are located at a farther position from the Peltier cell and therefore the necessity to use a solder casting of high thermal conductivity to efficiently disperse the parasitic heat from said farther tubes as well is eliminated.

As already said, this arrangement is also possible in the embodiments described with reference to FIGS. 2 to 5 that is provided with a metal casing.

However, in the present case, due to the use of plastic material to make the cap 420, less manufacturing difficulties arise and therefore costs are more reduced in making the openings, not shown in FIG. 6, adapted to enable passage of the tube 470 bundle through the cap 420 walls.

The process for fitting together the assembly consisting of the above mentioned parts is particularly simple. Initially the Peltier cell 440 is fastened to the base 430, in a manner adapted to achieve a convenient thermal contact using conventional methods such as gluing, soldering or conventional fastening means such as brackets or others, for example. Then the lower portion 462 of element 460 is fastened to the cell 420 so that an appropriate thermal contact is achieved by the use of the above mentioned conventional methods, for example. Afterwards, the tubes are housed in the grooves provided in the portion 462 and finally the upper portion 465 is conveniently laid so that the tubes are housed in the mating grooves present in said portion 465 too.

Once mounting of the assembly has been completed, the assembly is preferably fastened by a cap 420 of epoxy resin. The cap 420 can be obtained by hot molding or cold casting, directly on the assembly fitted together.

In addition, a barrier 490 made of an appropriate, preferably molded, plastic material can be inserted and disposed around the Peltier cell 440 for protecting it against a possible resin infiltration. It will be 30 recognized by a person of ordinary skill in the art that other assembling possibilities are available, such as mutual fixing of parts by adhesive resins or soldering, at the contact points.

Finally, the optical fiber is incorporated at the end of the assembling procedures of the parts, as above described.

As a person of ordinary skill in the art will easily understand, however, not only an optical fiber length on which an optical device has been made can be protected in accordance with the present invention, but also, depending on requirements, a mere optical fiber length or the optical fiber portion where splicing between two different fiber lengths has been carried out.

I claim:

1. An apparatus for protecting an optical fiber device comprising:

a casing having an inner volume;

at least one housing having an inner volume passing through said inner volume of said casing, wherein said housing has at least first and second outlets accessible from the outside of said casing and wherein at least one optical fiber length can be inserted through at least one of said first and second outlets in such a manner that the fiber length is located in the inner volume of said casing; and sealing means interposed between said at least one housing and said casing, wherein said inner volume of said at least one housing is insulated in a substantially impervious manner from the inner volume of the casing.

2. An apparatus according to claim 1, wherein at least one optical device is implemented on said at least one optical fiber length and said device is housed in the middle portion of said at least one housing within said casing.

3. An apparatus according to claim 1 further comprising a fastening means for securing said at least one optical fiber length to at least one end of the housing.

4. An apparatus according to claim 3, wherein said at least one optical fiber length is securable by said fastening means to only one end of the housing.

5. An apparatus according to claim 3, wherein said fastening means comprises a bonding resin.

6. An apparatus according to claim 3, wherein said fastening means comprises a soldering.

7. An apparatus for protecting an optical fiber device comprising:
    casing having an inner volume;
    at least one housing having an inner volume passing through said inner volume of said casing, wherein the housing has at least one outlet accessible from the outside of said casing, wherein the inner volume of the housing is adapted to house at least one optical fiber device; and
    sealing means interposed between said at least one housing and said casing, wherein the inner volume of said at least one housing is insulated in a substantially impervious manner from the inner volume of said casing.

8. An apparatus according to claim 7, wherein said at least one housing passes along a passage axis in said casing and has a lower thermal conduction in a lengthwise direction, parallel to the passage axis, than in a transverse direction.

9. An apparatus according to claim 8 comprising, within said casing, thermal control means for keeping an operative temperature within the inner volume of said casing.

10. An apparatus according to claim 9, wherein said at least one housing is in thermal contact with said control means.

11. An apparatus according to claim 10 comprising, within said casing, thermal contact means, said contact means creating a thermal contact between one portion of said at least one housing and said control means.

12. An apparatus according to claim 11, wherein said one portion of said at least one housing corresponds to the middle portion of said at least one housing within said casing.

13. An apparatus according to claim 12, wherein said thermal contact means is comprised of high thermal conductivity means.

14. An apparatus according to claim 13, wherein said high thermal conductivity means comprises a metal alloy of low melting point and high thermal conductivity applied between said at least one housing and said control means.

15. An apparatus according to claim 14, wherein said at least one housing has a low wettability to said alloy.

16. An apparatus according to claim 15, wherein said thermal contact means comprises means to make said portion of said one at least one housing wettable by said alloy.

17. An apparatus according to claim 14, wherein said housing has a high wettability to said alloy.

18. An apparatus according to claim 17, wherein said thermal contact means comprises means for limiting wetting by said alloy only to said one portion of said at least one housing.

19. An apparatus according to claim 11, wherein said at least one optical device is implemented on an optical fiber length and said device is inserted in said one portion of said at least one housing.

20. An apparatus according to claim 7 wherein said at least one housing is preferably made of a low heat conductivity material.

21. An apparatus according to claim 20, wherein the housing defines an envelope section and wherein the ratio of the product of the thermal conductivity of the material of said housing and the cross-sectional area of the envelope section of said housing to the length of the portion of said housing submitted to thermal gradient is included between 1/50 and 1/5000 W/°K.

22. An apparatus according to claim 21, wherein said ratio is included between 1/50 and 1/1200 W/°K.

23. An apparatus according to claim 7 wherein said at least one housing comprises an element of tubular form.

24. An apparatus according to claim 7, wherein a portion of said at least one housing extends outside of said casing and wherein said casing comprises thermal insulating means extending longitudinally around said at least one housing for increasing thermal insulation between a middle portion of said at least one housing within said casing and the portion of said at least one housing extending outside of said casing, said sealing means being interposed between said at least one housing and said insulating means of said casing.

25. An apparatus according to claim 7, wherein the inner volume of said casing is under a vacuum.

26. An apparatus according to claim 7, wherein the inner volume of said casing is filled with a gas having a thermal conductivity as high as that of the air at most.

27. An apparatus according to claim 26, wherein said gas is argon.

28. An apparatus according to claim 7, wherein the inner volume of said casing is filled with low thermal conductivity materials of an average filling density not higher than 4 g/cm$^3$.

29. An apparatus according to claim 7, wherein said at least one housing extends outside of said casing.

30. An apparatus according to claim 7, wherein said at least one housing comprises a plurality of housings.

31. An apparatus according to claim 30, wherein said plurality of housings is arranged in a bundle formed of housings having parallel axes.

32. An apparatus according to claim 30, wherein said plurality of housings is arranged in a bundle with parallel axes and in the same plane.

33. An apparatus according to claim 7 comprising means for facilitating a right positioning of an optical fiber length, upon which the optical device is implemented, within the housing.

34. A method of accomplishing protection for an optical fiber device in a casing having an inner volume comprising the following steps:
    inserting through said inner volume of said casing at least one housing having an inner volume and at least one outlet extending to the outside of the casing, wherein the inner volume of the housing is adapted to house at least one optical fiber device; and
    sealing said at least one housing to said casing to insulate the inner volume of said at least one housing in a substantially impervious manner from said inner volume of said casing.

35. The method of claim 34 further comprising the step of inserting at least one optical fiber device in the inner volume of said at least one housing.

36. A method according to claim 35, further comprising the step of fastening said at least one fiber device to at least one end of said at least one housing.

37. A method of protecting an optical fiber device comprising the following steps:

assembling an apparatus having at least one housing, wherein said housing comprises an inner volume adapted to house an optical fiber device, wherein the assembling comprises:

passing said inner volume of said at least one housing through an inner volume of a casing; and sealing said at least one housing to said casing to insulate the inner volume of the housing in a substantially impervious manner from the inner volume of said casing; and inserting an optical fiber device into said inner volume of said at least one housing.

38. A protected optical fiber device comprising:

a casing having an inner volume;

at least one housing having an inner volume and at least one outlet to the outside of the casing, wherein a portion of the inner volume of the housing is within the inner volume of the casing;

at least one optical fiber length having an overall volume, the optical fiber length being loosely positioned in the inner volume of the housing, wherein the difference between the inner volume of the housing and the overall volume of said at least one fiber length is sufficiently low to enable appropriate insulation of said at least one fiber length in the portion of the inner volume of the housing within the casing from the environment outside of the inner volume of the housing; and sealing means interposed between the housing and the casing, wherein the inner volume of said at least one housing is insulated in a substantially impervious manner from the inner volume of said casing.

* * * * *

UNITED STATES PATENT AND TRADEMARK OFFICE
CERTIFICATE OF CORRECTION

PATENT NO.   : 6,088,501
DATED        : July 11, 2000
INVENTOR(S)  : Delrosso

It is certified that error appears in the above-identified patent and that said Letters Patent is hereby corrected as shown below:

Title page, column 1,
[75] "Caltignaga" should read -- Caltignana --;

Column 4,
Line 11, change "representation" to -- representations --;

Column 6,
Line 19, change "40-50° C." to -- 40-50°K. --;
Line 25, change "W/°K$^{-1}$" to -- W/°K -- (both occurrences);
Line 52, change "C.), to -- K) --;

Column 8,
Line 50, change "them" to -- the --;

Column 9,
Line 49, change "to" to -- at --;

Column 12,
Line 38, cancel "30";

UNITED STATES PATENT AND TRADEMARK OFFICE
CERTIFICATE OF CORRECTION

PATENT NO. : 6,088,501
DATED : July 11, 2000
INVENTOR(S) : Delrosso

It is certified that error appears in the above-identified patent and that said Letters Patent is hereby corrected as shown below:

Column 13,
Line 18, before "casing" insert -- a --;
Line 59, after "said" insert -- one --;
Line 60, cancel "one".

Signed and Sealed this

Fourteenth Day of August, 2001

Attest:

NICHOLAS P. GODICI
Attesting Officer  Acting Director of the United States Patent and Trademark Office